(12) United States Patent
Le et al.

(10) Patent No.: US 6,336,183 B1
(45) Date of Patent: *Jan. 1, 2002

(54) SYSTEM AND METHOD FOR EXECUTING STORE INSTRUCTIONS

(75) Inventors: Hung Qui Le; Robert Greg McDonald; David James Shippy; Larry Edward Thatcher, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,140

(22) Filed: Feb. 26, 1999

(51) Int. Cl.⁷ .............................................. G06F 9/312
(52) U.S. Cl. ....................... 712/225; 712/208; 712/221; 712/222
(58) Field of Search .............................. 712/23, 41, 42, 712/208, 221, 222, 225

(56) References Cited

U.S. PATENT DOCUMENTS

| | | | | |
|---|---|---|---|---|
| 5,341,482 A | * | 8/1994 | Cutler et al. ................. | 712/244 |
| 5,467,473 A | * | 11/1995 | Kahle et al. ................... | 712/23 |
| 5,488,729 A | * | 1/1996 | Vegesna et al. ............. | 712/209 |
| 5,537,606 A | * | 7/1996 | Byrne ............................ | 712/7 |
| 5,659,782 A | * | 8/1997 | Senter et al. ................. | 712/23 |
| 5,825,677 A | * | 10/1998 | Agarwal et al. ............ | 708/520 |
| 5,903,740 A | * | 5/1999 | Walker et al. .............. | 712/217 |
| 6,134,646 A | * | 10/2000 | Feiste et al. .................. | 712/23 |

* cited by examiner

Primary Examiner—William M. Treat
(74) Attorney, Agent, or Firm—Kelly K. Kordzik; Winstead Sechrest & Minick, P.C.; Anthony V. S. England

(57) ABSTRACT

In a processor, store instructions are divided or cracked into store data and store address generation portions for separate and parallel execution within two execution units. The address generation portion of the store instruction is executed within the load store unit, while the store data portion of the instruction is executed in an execution unit other than the load store unit. If the store instruction is a fixed point execution unit, then the store data portion is executed within the fixed point unit. If the store instruction is a floating point store instruction, then the store data portion of the store instruction is executed within the floating point unit.

16 Claims, 10 Drawing Sheets

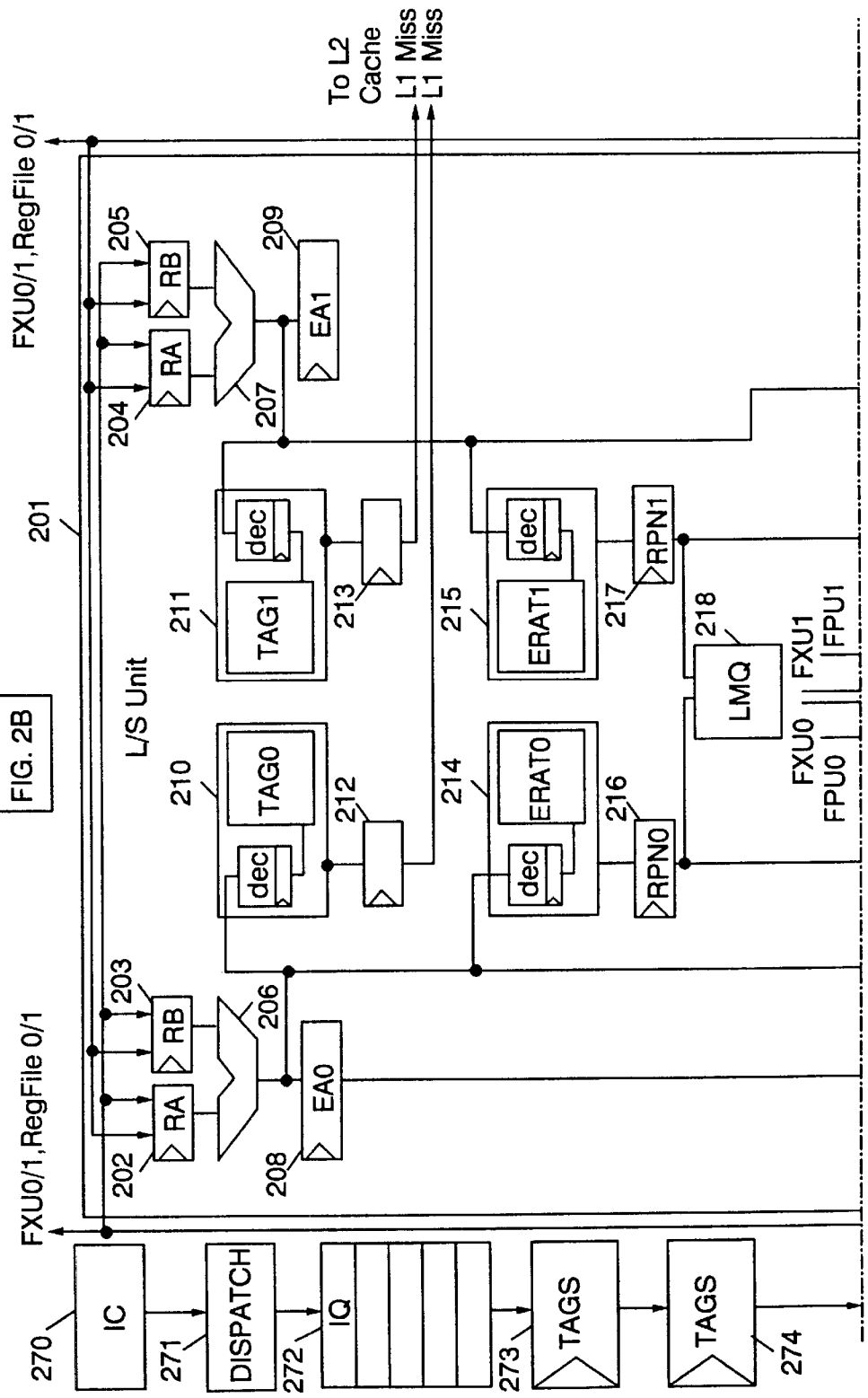

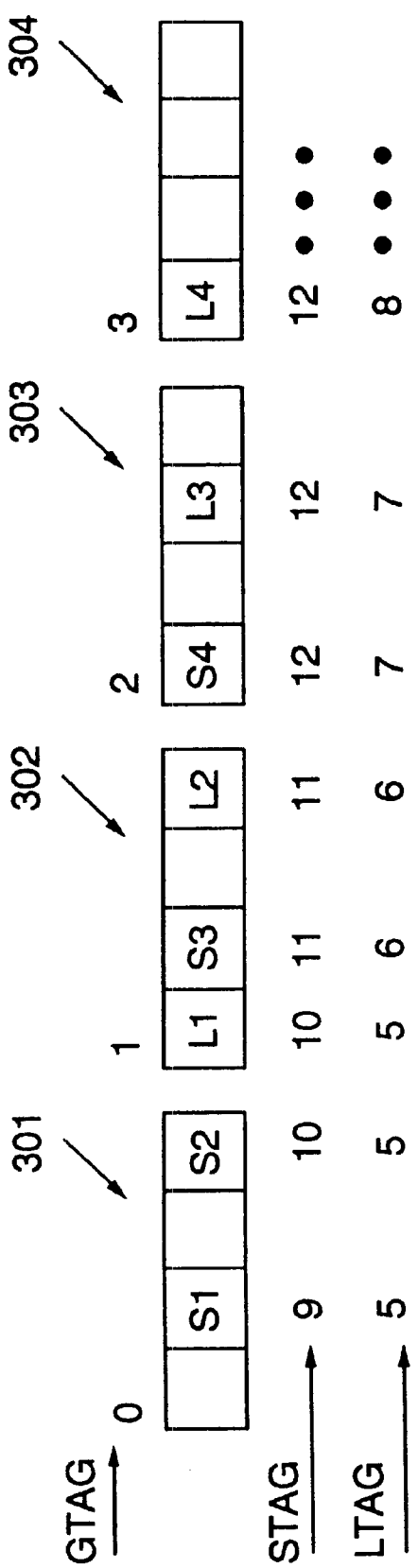

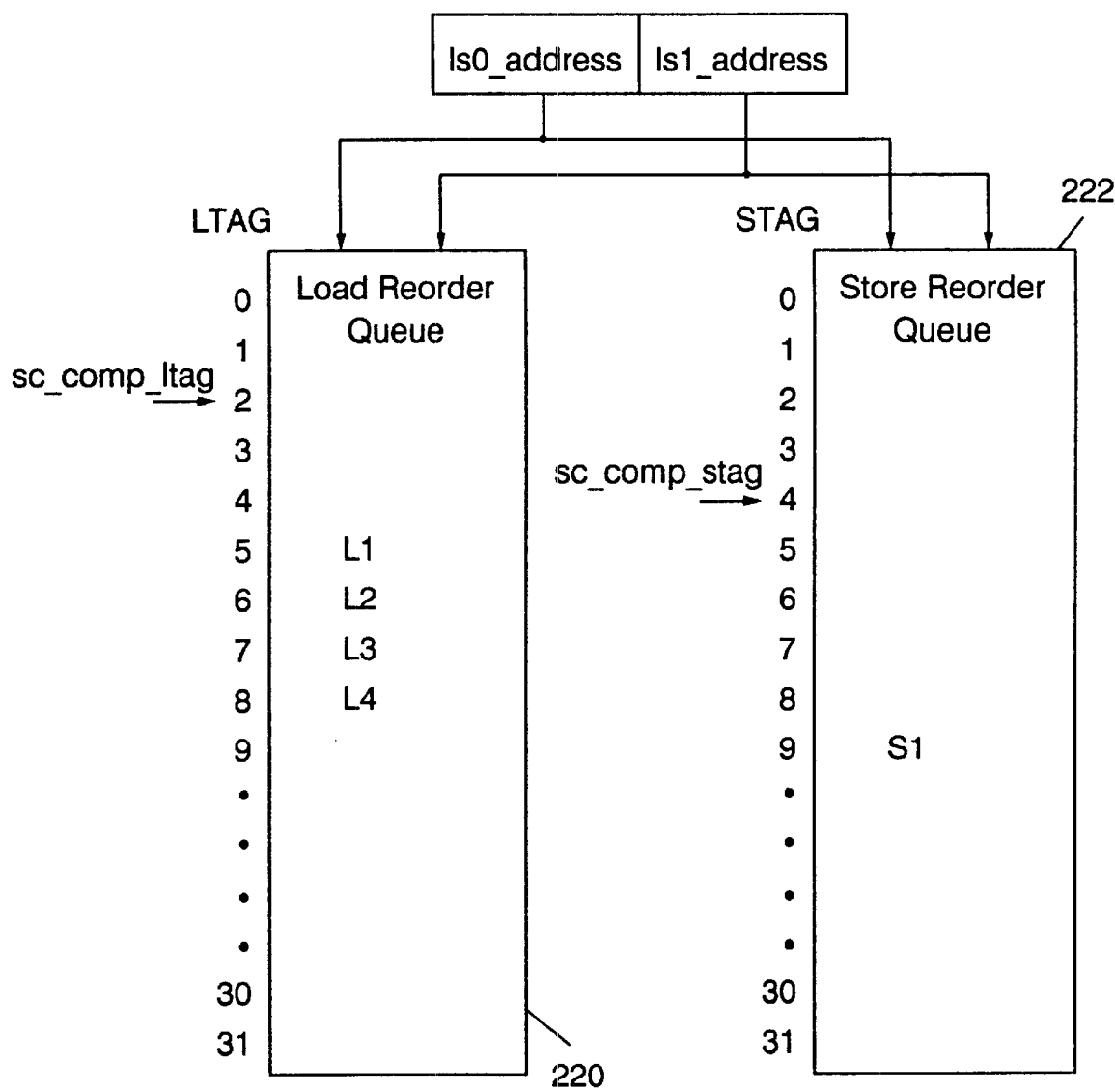

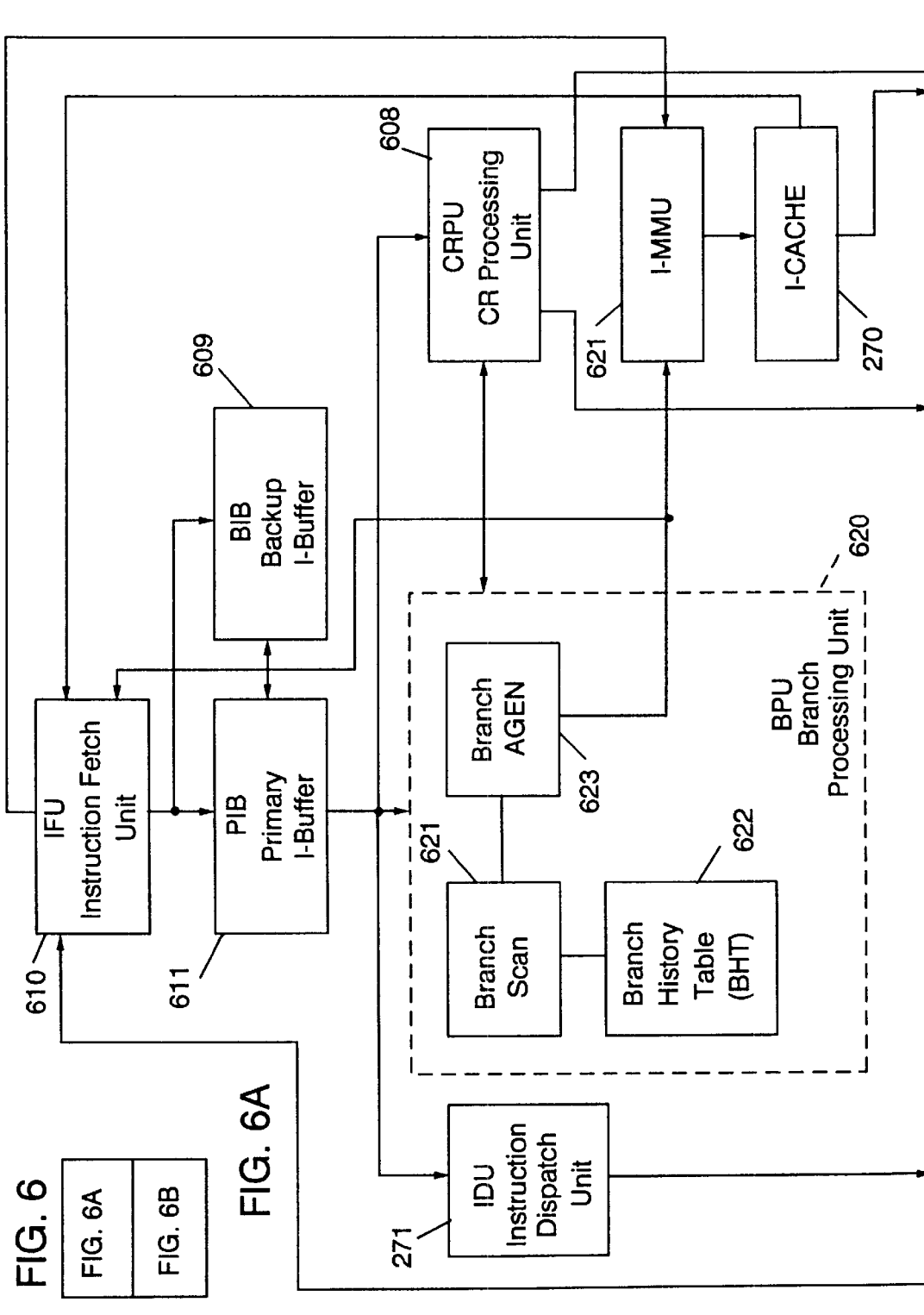

SYSTEM AND METHOD FOR EXECUTING STORE INSTRUCTIONS

TECHNICAL FIELD

The present invention relates in general to data processing systems, and in particular, to the execution of store instructions in a processor.

BACKGROUND INFORMATION

In order to increase the operating speed of microprocessors, architectures have been designed and implemented that allow for the out-of-order execution of instructions within the microprocessor. However, traditionally, load and store instructions have not been executed out of order because of the very nature of their purpose. For example, if a store instruction is scheduled to be executed in program order prior to a load instruction, but the processor executes these two instructions out of order so that the load instruction is executed prior to the store instruction, and these two instructions are referring to the same memory space, there is a likelihood that the load instruction will load incorrect, or old, data since the store instruction was not permitted to complete prior to the load instruction.

Furthermore, even if such store and load instructions are permitted to execute out of order, a store operation may still be stalled waiting for necessary data to become available. Therefore, there is a need in the art to improve the performance of executing store instructions in a processor.

SUMMARY OF THE INVENTION

The present invention addresses the foregoing need by dividing the execution of store instructions into two separate execution units. If the store instruction is a floating point store instruction, then the floating point store instruction is sent to the load store unit for generation of the address portion of the store instruction and the floating point execution unit for execution of the store data portion of the store instruction. If the store instruction is a fixed point store instruction, then the store instruction is divided (cracked) into an address generation internal op code and a store data internal op code. The store data internal op code is executed within the fixed point execution unit, while the address generation internal op code is executed within the load store unit. As a result, execution of a store instruction is divided into parallel tasks, which can be executed concurrently and independent of each other. Upon completion of all older instructions, the divided or cracked store instruction is then completed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a tagging method in accordance with the present invention;

FIG. 4 illustrates ordering of load and store instructions in a load reorder queue and a store reorder queue, respectively;

DETAILED DESCRIPTION

Figure 1:
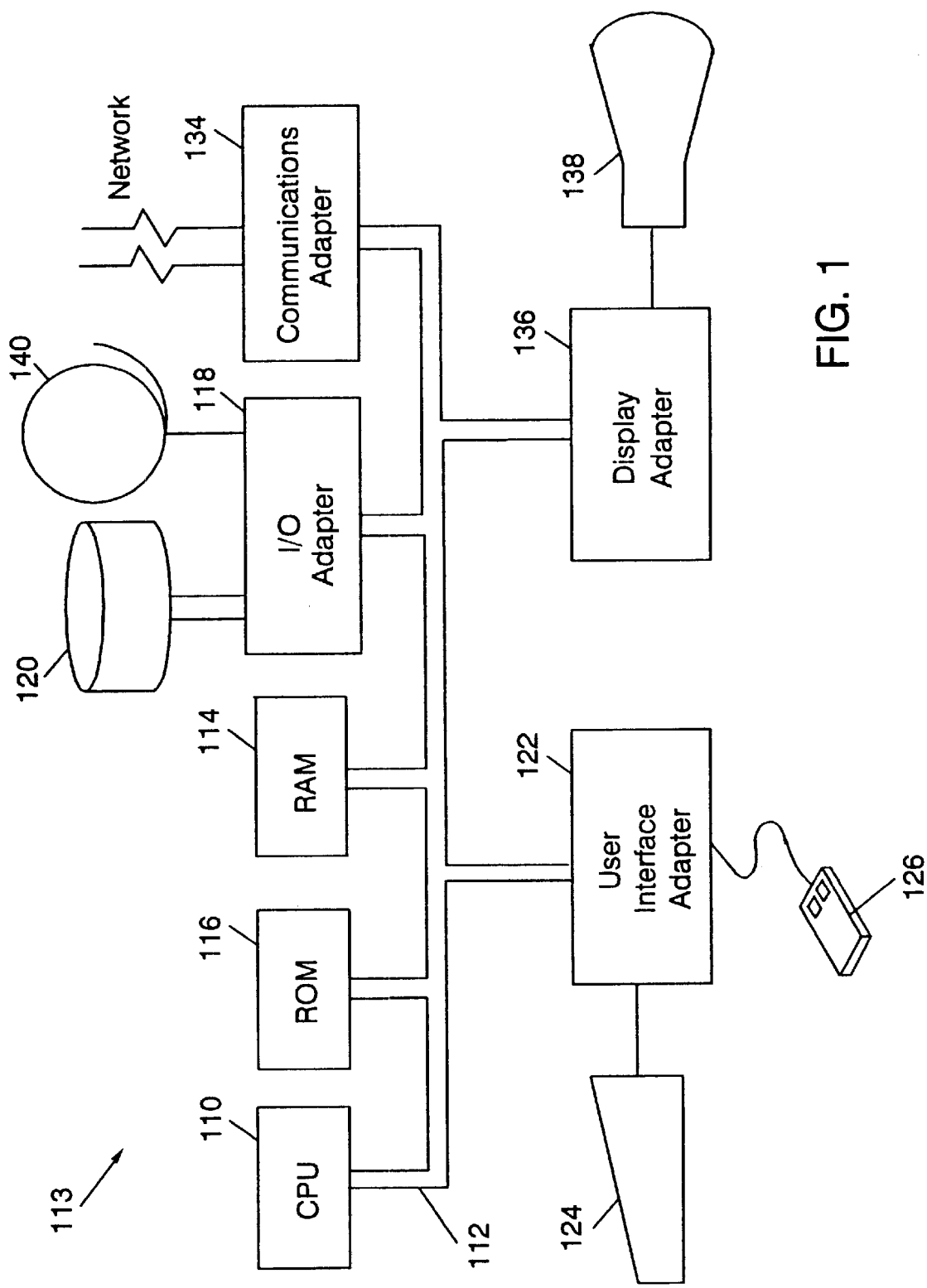
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry (other than load/store unit 201) as described below with respect to FIG. 6. CPU 110 may also reside on a single integrated circuit.

Figure 6B:
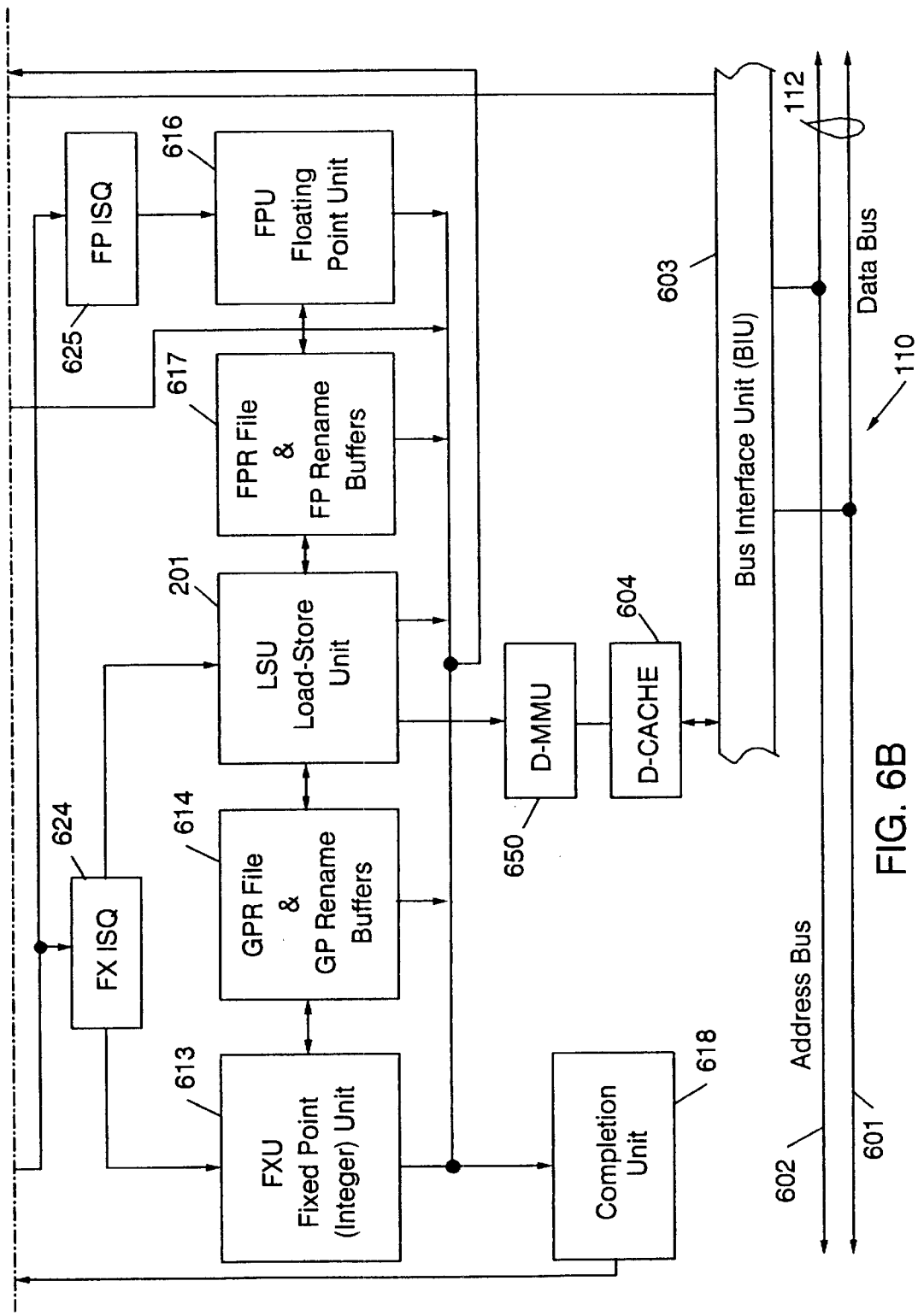
FIG. 6 illustrates a processor configured in accordance with the present invention.

Referring to FIG. 6, there is shown processor 110 coupled to bus 112 comprising address bus 602 and data bus 601. Bus 112 is coupled to bus interface unit ("BIU") 603. Instruction cache ("I cache") 270 is coupled to BIU 603 and to instruction fetch unit ("IFU") 610. Instruction cache 270, which may include tag bits, is also coupled to instruction memory management unit ("I-MMU") 621.

Processor 110 also contains branch processing unit ("BPU") 620, primary instruction buffer ("PIB") 611, and instruction dispatch unit ("IDU") 271.

BPU 620 includes branch scan logic 621, branch address generator ("AGEN") 623, and BHT 622.

In a typical implementation, data is received from data bus 601 by BIU 603 and transferred through data cache ("D cache") 604 through D-MMU 650 to load/store unit 201. Instruction cache 270 receives instructions from BIU 603 and passes these on to IFU 610.

BPU 620 is operable for receiving branch instructions and performing look-ahead operations on conditional branches to resolve them early. PIB 611 receives instructions from IFU 610 and passes these on to IDU 271. IDU 271 is operable for dispatching instructions to issue queues 624 and 625. Issue queue 624 receives fixed point and load store instructions. Issue queue 625 receives floating point instructions. Issue queue 624 issues load store instructions to load/store unit ("LSU") 201, and fixed point instructions to fixed point unit ("FXU") 613. Issue queue 625 issues floating point instructions to floating point unit ("FPU") 616. These execution units are also coupled to completion unit 618, which tracks instructions from dispatch through execution, and then retires, or "completes" them in program order. Completion unit 618 contains a queue of completion buffers, collectively known as the reorder buffer. Completion unit 618 is also coupled to IFU 610.

Also coupled to FPU 616 is FPR file and rename buffers 617.

Coupled to FXU 613 is general purpose register ("GPR") file 614 and associated general purpose ("GP") rename register buffers. Also coupled to BPU 620 is CR processing unit ("CRPU") 608.

Processor 110 may be a high-performance superscalar processor capable of issuing multiple instructions every cycle. During each clock cycle, IFU 610 attempts to fetch several instructions at one time, using the current "instruction fetch address" ("IFA"), which is stored within the instruction fetch address register ("IFAR"). The default IFA is the next sequential address following the last instruction fetched in the previous cycle. However, the IFA may be modified by BPU 620, if a scanned branch is resolved (or predicted) to be "taken." The IFA may also need to be reset to the true (resolved) branch path address following a detected misprediction.

Processor 110 may include backup instruction buffer ("BIB") 609, in addition to PIB 611 in some implementations. This would limit speculative execution down p predicted branch paths, where p is the number of separate buffers within the BIB 609.

Figure 2B:
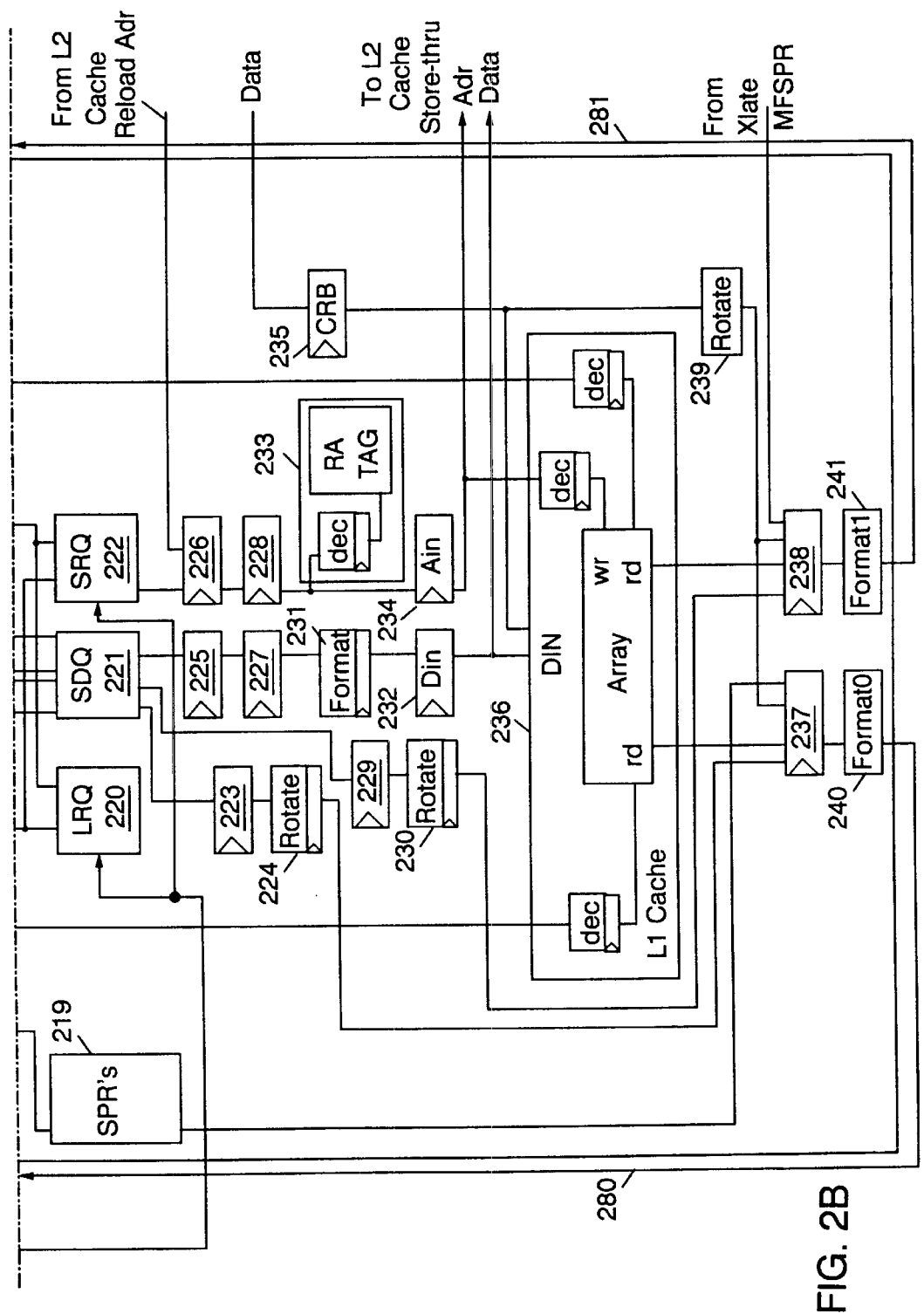
FIG. 2 illustrates a load/store unit configured in accordance with the present invention.

FIG. 2 illustrates load/store (L/S) unit 201 configured in accordance with the present invention. L/S unit 201 has two pipelines so that two load or store instructions can be issued per machine cycle. Registers 202–205 receive instructions from fixed point units (FXUs) 0 and 1 (not shown) in a manner well-known in the art. 64-bit adder 206 adds operands received from registers 202 and 203, while 64-bit adder 207 adds operands from registers 204 and 205 to produces a pair of 64-bit effective addresses. These effective addresses are outputted to registers 208 and 209, respectively. Registers 208 and 209 capture the effective addresses (EA). They then both feed LMQ 218, LRQ 220 and SRQ 222, which all need a portion of the EA in addition to the real address from registers 216 and 217 to perform address checking. Additionally, the effective addresses are decoded to access tag arrays 210 and 211 to determine if there is a hit or a miss within L1 cache 236. If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are run through the translation operation in translators 214, 215, then inserted into the store data queue (SDQ) 221 and the store re-order queue (SRQ) 222 for storage into the L1 cache 236 after the instructions have been completed. Therefore, store instructions are executed out of order, but written into the L1 cache 236 in order.

The store reorder queue (SRQ) 222 keeps track of store instructions that have been executed. SRQ 222 maintains the store instructions in the queue and determines when the data is available in the store data queue (SDQ) 221 and when the store instruction is next to complete. The store to the L1 cache 236 is then completed.

Many of the registers 223, 225–229, and 237–238 are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction. Rotate blocks 224 and 230 are utilized for store forwarding. Therefore, if there is a store instruction that is sitting in the store queue and has not been written into the queue yet because it is not next to complete, and then a younger load instruction is received that needs that data, the data will be forwarded to the load instruction being executed.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

Referring next to FIG. 3, there is illustrated a diagram of a method for assigning tags to load and store instructions. Instructions are received from the instruction cache 270 by the instruction dispatch unit 271, which assigns tags to the load and store instructions as described herein. The instructions are then temporarily stored in the instruction queue 272. Blocks 273 and 274 are inserted for purposes of timing. 16 instructions in blocks of 4 (blocks 301–304) are analyzed at a time for the load/store tagging method of the present invention. Each block 301–304 is assigned a group tag (GTAG). Each store instruction is assigned an STAG and an LTAG. The STAG is incremented by a preceding store instruction (in program order), and the LTAG is incremented by preceding load instructions. Similarly, the LTAG is incremented by a preceding load.

For example, the program order of the store instructions are S1, S2, S3, and S4. Store instruction S1 has an STAG of 9. The next store instruction S2 is then assigned an STAG of 10. The next store instruction S3 has an STAG of 11, and then the STAG is incremented to a 12 for the next store instruction S4. The load instructions L1, L2, L3, and L4 (in program order) are assigned the STAGs of the previous store instruction. Therefore, load instruction L1 receives an STAG of 10, which is the same STAG as the preceding store instruction S2. Load instruction L2 receives an STAG of 11, which is the same STAG as the preceding store instruction S3. Load instruction L3 receives an STAG of 12, which is the same STAG as the preceding store instruction S4. Load instruction L4 also receives an STAG of 12, since the STAG that immediately precedes the load instruction L4 is still the store instruction S4 having an STAG of 12.

The LTAGs for the store instructions are incremented based on the LTAG of a preceding load instruction. As a result, the LTAG for store instruction S3 is incremented to 6 because the LTAG for the preceding load instruction L1 is 5. The LTAGs are not incremented until the next store instruction S4 which is assigned an LTAG of 7 based on the previous LTAG of 6 for the load instruction L2. LTAGs are also incremented by a preceding load instruction. Therefore, the LTAG for load instruction L4 is assigned an 8 because the LTAG for the preceding load instruction L3 is a 7.

Referring next to FIG. 4, the addresses for the load store unit 0 (ls0_address) and the load store unit 1 (ls1_address) are queued in the load reorder queue 220 and the store reorder queue 222 in position relative to their LTAG (STAG). The pointers sc_comp_ltag and sc_comp_stag for the LRQ 220 and SRQ 222, respectively, indicate the last load or store instruction to complete, respectively.

As an example, load instruction L1 is placed in a position in LRQ 220 corresponding to its LTAG assignment of 5.

Figure 5A:
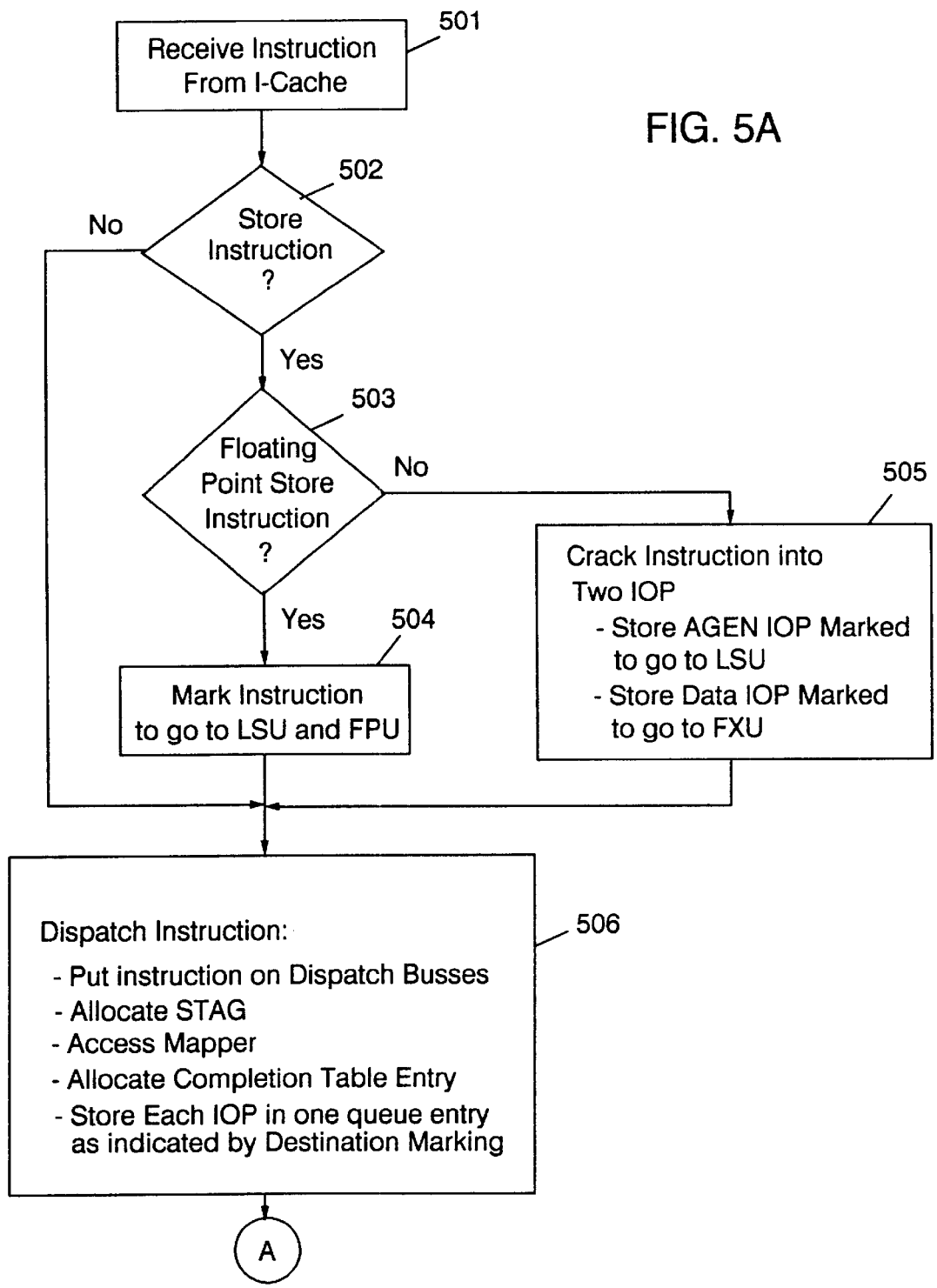
FIG. 5 illustrates a flow diagram for flushing instructions in accordance with the present invention.
Figure 5B:
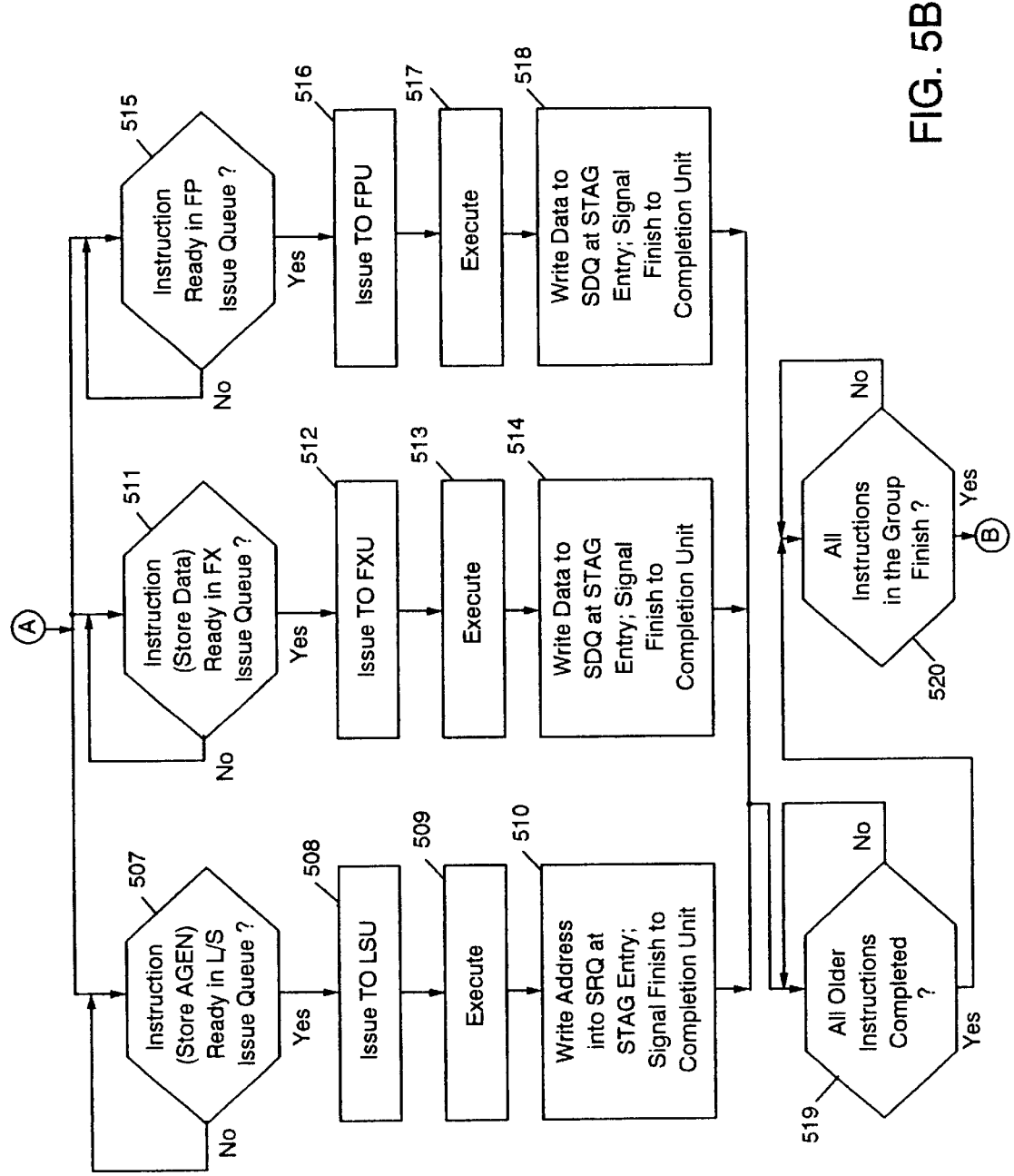
Figure 5C:
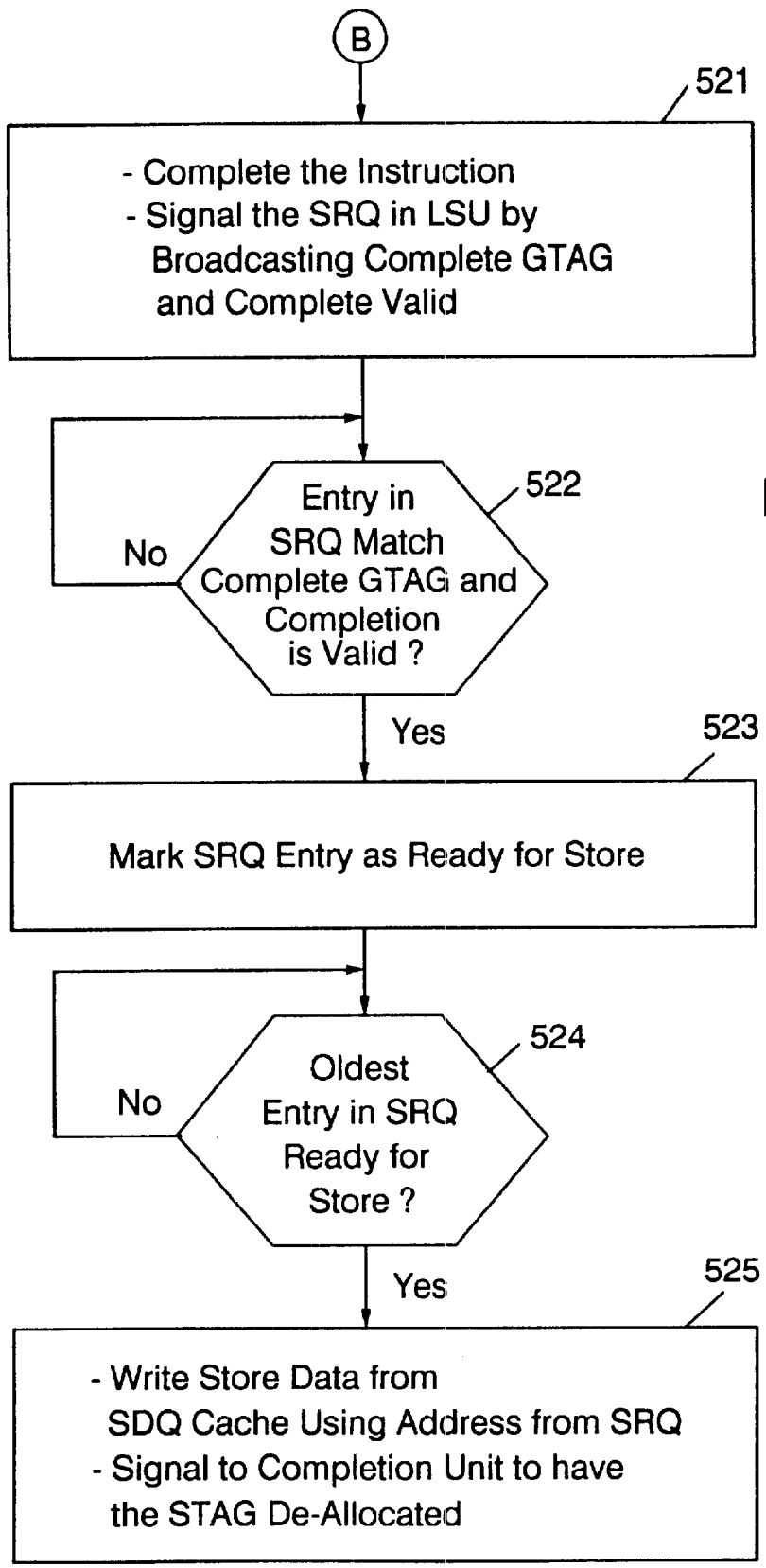

Referring next to FIG. 5, the present invention divides or "cracks" a store instruction into two operations—the AGEN (address generation) operation and the store data to memory operation. The present invention utilizes a store reorder queue to hold the address and a store data queue to hold the data. The store operation cannot complete until both are available, however interdependencies of the two operations can be separately resolved.

In step 501, an instruction is received from the I-Cache 270. In step 502, a determination is made whether the received instruction is a store instruction. If not, the process proceeds to step 506. However, if the instruction is a store instruction, then the process proceeds to step 503 to determine whether the store instruction is a floating point store instruction or a fixed point store instruction. If the store instruction is a floating point store instruction, the process proceeds to step 504 to mark the floating point store instruction to be sent to the load store unit 201 and the floating point unit 616 for execution.

However, if the store instruction is a fixed point store instruction, then the process proceeds to step 505 to crack the instruction into two internal op codes (IOPs). The first IOP is a store address generation (AGEN) IOP marked to be sent to the load store unit 201. The other portion of the cracked instruction is the store data IOP marked to go to the fixed point unit 613. Steps 502–505 may be performed within the instruction dispatch unit 271.

Thereafter, in step 506, the store instruction, whether it is a floating point store instruction or a fixed point store instruction, is dispatched by the instruction dispatch unit 271. This step involves placing the store instruction on the dispatch busses. Furthermore, an STAG is allocated for the store instruction. Furthermore, a mapper (not shown) is accessed to perform a renaming operation on the store instruction. Also, an entry is allocated in the completion unit 618 for the store instruction.

Upon dispatch, each portion of the store instruction is stored in an issue queue as indicated by the destination marking performed in either step 504 or 505. If the store instruction is a fixed point store instruction, then the store address portion is sent to the issue queue 624, and the store data portion is also sent to the issue queue 624. If the store instruction is a floating point store instruction, then the same instruction is sent to issue queue 624 and issue queue 625. The floating point store instruction in issue queue 624 is treated as the store address portion of the instruction by the load store unit 201. The floating point store instruction in issue queue 625 is treated as the store data portion of the instruction by the floating point unit.

In step 507, the store address generation portion remains in the load store unit issue queue until the load store unit 201 is ready to execute the instruction. Likewise, the store data portion of a fixed point store instruction will remain in the issue queue in step 511 until the fixed point unit 613 is available to execute this portion of the instruction. And, likewise, in step 515, the store data portion of a floating point store instruction will remain in the floating point issue queue until the floating point unit 616 is ready to execute.

In steps 508, 512, and 516, the respective store instruction portions are issued to their respective execution units for execution in steps 509, 513, and 517, respectively.

Essentially, in step 509, the load store unit 201 will generate the memory address to where the data will be stored. In steps 513 and 517, the fixed point unit/floating point unit will perform the store data portion of the instruction, which may involve manipulation of the data, such as expansion of the size of the data or conversion of the data from one form to another.

In step 510, within the load store unit 201, the address generated will be stored in the SRQ 222 at an entry indicated by the store STAG. A finish signal will be sent to the completion unit 618.

In steps 514 and 518, the data will be written to the SDQ 221 at an entry indicated by the store STAG and the finish signal will be sent to the completion unit 618. The SDQ 221 has a dedicated port per execution unit. When each execution unit executes the store data iop, it sends the data and the STAG to the SDQ 221 so that the data is written to the SDQ 221 at the location address by the STAG. Note that one STAG is assigned to the store instruction at dispatch.

Thereafter, in step 519, a determination is made whether all instructions older than the store instruction have completed. If yes, the process proceeds to step 520 to determine if all instructions within the Group in which the store instruction was located have finished. If yes, then the process proceeds to step 521 to complete the store instruction and signal the SRQ 222 by broadcasting complete GTAG and complete valid signals.

Thereafter, in step 522, a determination is made whether the entry in the SRQ 222 matches the complete GTAG and complete valid signals. One of the fields in the SRQ 222 is the GTAG, which is uniquely assigned to the store instruction when it is dispatched. The GTAG field in the SRQ 222 is written when the store address iop is executed by the LSU 201 at the location specified by the STAG of the store instruction. Whenever an instruction completes, the GCT broadcasts the GTAG to the SRQ 222. The SRQ 222 sets a bit at the location which contains a GTAG that matches the broadcasted complete GTAG. This bit indicates that the store instruction that consists of both store address iop and store data iop has completed and is ready to store.

Thereafter, in step 523, the SRQ 222 entry is marked as ready for store. In step 524, a determination is made whether the oldest entry in the SRQ 222 is ready for store. If yes, then in step 525, the data associated with the store instruction is written from the SDQ 221 using the address from the SRQ 222 into the L1 Cache 236. A signal is sent to the completion unit 618 to have the store instruction's STAG de-allocated.

Although the present invention and its advantages have been described in detail, it should be understood that various changes, substitutions and alterations can be made herein without departing from the spirit and scope of the invention as defined by the appended claims.

What is claimed is:

1. A method for executing a store instruction in a processor, comprising the steps of:
   executing address generation portion of the store instruction in a load/store unit; and
   executing write data portion of the store instruction in an execution unit other than the load/store unit.

2. The method as recited in claim 1, wherein the execution unit other than the load/store unit is the floating point unit if the store instruction is a floating point store instruction.

3. The method as recited in claim 1, wherein the execution unit other than the load/store unit is the fixed point unit if the store instruction is a fixed point store instruction.

4. The method as recited in claim 3, wherein the fixed point store instruction is cracked into two internal op codes.

5. The method as recited in claim 4, wherein a first one of the two internal op codes is a store address generation internal op code executed by the load/store unit, and wherein a second one of the two internal op codes is a store data internal op code executed by the fixed point unit.

6. The method as recited in claim 1, further comprising the steps of:
   writing an address generated by the address generation portion of the store instruction into a store reorder queue; and
   writing the data generated by the write data portion of the store instruction into a store data queue.

7. The method as recited in claim 6, further comprising the step of completing the store instruction when all instructions older than the store instruction have completed.

8. A processor comprising:
   a load/store unit for executing an address generation portion of a store instruction; and
   an execution unit other than the load/store unit for executing a store data portion of the store instruction.

9. The processor as recited in claim 8, wherein the execution unit other than the load/store unit is the floating point unit if the store instruction is a floating point store instruction.

10. The processor as recited in claim 8, wherein the execution unit other than the load/store unit is the fixed point unit if the store instruction is a fixed point store instruction.

11. The processor as recited in claim 10, further comprising an instruction dispatch unit for cracking the fixed point store instruction into two internal op codes.

12. The processor as recited in claim 11, wherein a first one of the two internal op codes is a store address generation internal op code executed by the load/store unit, and wherein a second one of the two internal op codes is a store data internal op code executed by the fixed point unit.

13. The processor as recited in claim 8, wherein the load/store unit writes an address generated by the address generation portion of the store instruction into a store reorder queue, and wherein the execution unit writes the data generated by the write data portion of the store instruction into a store data queue.

14. The processor as recited in claim 13, further comprising circuitry for completing the store instruction when all instructions older than the store instruction have completed.

15. The processor as recited in claim 9, wherein the floating point store instruction is treated as two different internal operations after dispatch.

16. A processor comprising:
   an instruction cache receiving an instruction;
   circuitry for determining if the instruction is a store instruction;
   circuitry for determining if the store instruction is a floating point store instruction or a fixed point store instruction when the instruction is a store instruction;
   a load/store unit;
   a fixed point unit;
   a floating point unit;
   an instruction dispatch unit for marking the store instruction to be sent to the load/store unit and the floating point unit when the store instruction is a floating point store instruction, wherein the instruction dispatch unit cracks the store instruction into a store address generation internal op code and a store data internal op code when the store instruction is a fixed point store instruction, wherein the store address generation internal op code is marked to be sent to the load/store unit, and wherein the store data internal op code is marked to be sent to the fixed point unit;
   circuitry for dispatching the floating point store instruction to an issue queue in each of the load/store unit and the floating point unit;
   circuitry for dispatching the store address generation internal op code to the issue queue in the load/store unit;
   circuitry for dispatching the store data internal op code to an issue queue in the fixed point unit;
   circuitry for executing the floating point store instruction in the load/store unit when the load/store unit is ready;
   circuitry for executing the floating point store instruction in the floating point unit when the floating point unit is ready;
   circuitry for executing the store address generation internal op code in the load/store unit when the load/store unit is ready;
   circuitry for executing the store data internal op code in the fixed point unit when the fixed point unit is ready;
   circuitry for writing an address generated in the load/store unit into a store reorder queue in the load/store unit;
   circuitry for writing write data into a store data queue;
   circuitry for determining if all instructions older than the store instruction have completed;
   circuitry for determining if all instructions in a group that included the store instruction have finished when all instructions older than the store instruction have completed;
   circuitry for completing the store instruction when all instructions in the group that included the store instruction have finished; and
   circuitry for storing the store data into a cache using the address generated.

* * * * *